United States Patent
Pagel et al.

(10) Patent No.: US 11,913,564 B2
(45) Date of Patent: Feb. 27, 2024

(54) VALVE, VALVE STACK, AND COMPONENT WITH VALVE AND/OR VALVE STACK

(71) Applicant: A. Kayser Automotive Systems GmbH, Einbeck (DE)

(72) Inventors: Kenny Pagel, Dresden (DE); Christoph Eppler, Dresden (DE); Benjamin John, Dresden (DE); Heiko Freter, Einbeck (DE)

(73) Assignee: A Kayser Automotive Systems GmbH, Einbeck (DE)

( * ) Notice: Subject to any disclaimer, the term of this patent is extended or adjusted under 35 U.S.C. 154(b) by 4 days.

(21) Appl. No.: 17/969,777

(22) Filed: Oct. 20, 2022

(65) Prior Publication Data

US 2023/0125583 A1    Apr. 27, 2023

(30) Foreign Application Priority Data

Oct. 21, 2021    (DE) ..................... 10 2021 005 255.2

(51) Int. Cl.
*F16K 31/02* (2006.01)
*F16K 11/22* (2006.01)
*F16K 11/24* (2006.01)

(52) U.S. Cl.
CPC ............ *F16K 31/025* (2013.01); *F16K 11/22* (2013.01); *F16K 11/24* (2013.01)

(58) Field of Classification Search
CPC ...... F16K 31/025; F16K 11/22; F16K 27/003; F16K 27/063; F16K 11/24
See application file for complete search history.

(56) References Cited

U.S. PATENT DOCUMENTS

| | | | | |
|---|---|---|---|---|
| 3,215,396 | A * | 11/1965 | Bergsma | F16K 31/025 60/527 |
| 6,279,869 | B1 * | 8/2001 | Olewicz | F16K 7/045 251/9 |
| 8,356,792 | B2 * | 1/2013 | Grimseth | E21B 41/0007 251/95 |
| 9,895,969 | B2 * | 2/2018 | Alexander | E05C 19/022 |
| 9,927,035 | B2 * | 3/2018 | Alexander | F16K 27/003 |

(Continued)

FOREIGN PATENT DOCUMENTS

| | | | | |
|---|---|---|---|---|
| CN | 112283389 | A * | 1/2021 | ........... F16K 31/025 |
| CN | 112303293 | A * | 2/2021 | .............. F16K 11/22 |

(Continued)

*Primary Examiner* — Umashankar Venkatesan
(74) *Attorney, Agent, or Firm* — Gerald E. Hespos; Michael J. Porco (57) ABSTRACT

A valve housing (1) has first and third openings (1.1, 1.3), and first and second actuating elements (6.1, 6.2) that are movable along a longitudinal axis of the housing (1). A return element (5) is between the actuating elements (6.1, 6.2), and exerts a force to keep the actuating elements (6.1, 6.2) in a rest position to close or open the first and third openings (1.1, 1.3). First and second wires (4.1, 4.2) are formed from a shape memory alloy. The first wire (4.1) is on the first actuating element (6.1) and the second wire (4.2) is on the second actuating element (6.2). An electric current to the first or second wire (4.1, 4.2) contracts the respective wire (4.1, 4.2) and moves the corresponding actuating element (6.1, 6.2) into an activated position against the force exerted by the return element (5).

13 Claims, 8 Drawing Sheets

(56) References Cited

U.S. PATENT DOCUMENTS

| | | | | |
|---|---|---|---|---|
| 9,958,081 B2* | 5/2018 | Deperraz | ................ | F03G 7/065 |
| 10,132,300 B2* | 11/2018 | Gaj | ........................ | F03G 7/06 |
| 10,995,873 B2* | 5/2021 | Mitzler | ................ | B60N 2/914 |
| 11,054,053 B2* | 7/2021 | Mitzler | ................ | F16K 31/025 |
| 2016/0157669 A1* | 6/2016 | Andreis | ................ | A47J 31/461 |
| | | | | 222/129.1 |
| 2022/0205551 A1* | 6/2022 | Nicola | ................ | F16K 31/025 |

FOREIGN PATENT DOCUMENTS

| | | | | |
|---|---|---|---|---|
| CN | 115126902 A * | 9/2022 | | |
| DE | 19810009 C1 * | 7/1999 | ........... | F16K 31/025 |
| DE | 102005060217 | 7/2006 | | |
| DE | 102012223602 A1 * | 6/2013 | ............. | F03G 7/065 |
| DE | 102013009775 A1 * | 12/2014 | .......... | F15B 13/0821 |
| DE | 102017217213 B3 * | 3/2019 | | |
| DE | 102018216375 A1 * | 3/2019 | ............. | B60N 2/914 |
| DE | 102018131802 A1 * | 6/2020 | | |
| EP | 2743552 A1 * | 6/2014 | ........... | F16K 31/002 |

* cited by examiner

VALVE, VALVE STACK, AND COMPONENT WITH VALVE AND/OR VALVE STACK

FIELD OF THE INVENTION

The invention relates to a valve, in particular a pneumatic valve, a valve stack including a plurality of such valves, and a component, in particular a vehicle seat that has at least one such valve and/or the valve stack.

RELATED ART

Valves are used to control one or more fluids in the most diverse areas of technology. For example, valves are used in single-acting cylinders in production plants. In addition, valves are used in medical devices, for example for controlling an armband of a blood pressure measuring device, and in vehicle technology.

Seat systems in motor vehicles have conventional mechanisms for tilting a backrest or for setting a distance to the front. Other adjustment axes also are integrated in the backrest, the seat cushion, and the headrest. Other comfort components are pneumatic systems, with which individual parts of the body can be supported or relieved. These comfort components include a large number of air cushions that are attached under the upholstery and covers and are inflated and deflated via fast-acting valves with powerful compressors. To this end, two different solutions are being pursued: In electrodynamic systems, the air flow is controlled with the help of miniaturized lifting magnets or solenoid motors. Here, a permanent magnetic rotor is moved in a cylinder coil. The disadvantage here is the high weight, the high energy consumption, and the acoustic emissions.

Another option for actuating the valves is based on the use of thermal shape memory alloys (SMA) as actuators. If these materials are heated above a certain temperature, they undergo a reversible structural transformation, which is accompanied by changes in properties and external geometry (e.g. length). More precisely, these are alloys that occur in two different structural states depending on their temperature. At room temperature there is a martensitic structure, which transforms into an austenitic structure in the case of a face-centered cubic lattice at a certain limit temperature, around 80° C. A wire made of a shape memory alloy shortens during the transformation into the austenitic state and thereby can perform work and, for example, actuate a valve element against the action of a return element. This provides an active principle with which forces and strokes can be generated noiselessly in even the smallest construction space.

DE 10 2005 060 217 B4 discloses a 3/3-way valve in which the valve stages are applied in duplicate on a carrier. The disadvantage here, however, is the comparatively large number of parts that are necessary due to the duplicate design on the carrier.

It is therefore an object of the invention to provide a valve that avoids the disadvantages mentioned, i.e. that can be constructed in a simple way with as few parts as possible and with a low weight.

SUMMARY OF THE INVENTION

The valve according to the invention comprises a housing having at least a first opening, a second opening, and a third opening. The valve also comprises a first actuating element and a second actuating element that are movable along a common longitudinal axis along a guide of the housing. A return element is arranged between the first actuating element and the second actuating element. The return element exerts a force that keeps the first actuating element and the second actuating element in a rest position in which the first actuating element closes or opens the first opening and the second actuating element closes or opens the third opening. The valve according to the invention further comprises a first wire that is formed with or from a shape memory alloy and that is arranged on the first actuating element and on a part of the housing opposite the first actuating element. In addition, the valve comprises a second wire that is formed with or from a shape memory alloy and that is arranged on the second actuating element and on a part of the housing opposite the second actuating element. By applying an electric current to the respective first or second wire and the resulting contraction of the respective wire, the corresponding actuating element is movable from the rest position into an activated position against the force exerted by the return element.

Each of the two adjusting elements can have an adjusting element body and a sealing element. Alternatively, the respective actuating element can also comprise a connecting rod connecting the corresponding actuating element body to the associated sealing element.

In the rest position, the first actuating element body and the second actuating element body are at a first distance from one another. In contrast, in the activated position, the first actuating element body and the second actuating element body are at a second distance from one another that is smaller than the first distance.

Thus, if an electric current is applied to the corresponding wire, the wire heats up, changes to an austenitic state and consequently shortens. If the electric current is interrupted, the wire cools down again, goes into a martensitic state and regains its predefined length in the rest position of the corresponding actuating element.

The two actuating elements and the housing can be designed such that the two actuating elements are movable on or in the guide of the housing.

The return element acts on both actuating elements. Thus, a reduction in the required components and the weight of the valve can be achieved, with reliable activation of the two actuating elements and associated control of a volume flow of one or more fluids being achieved at the same time. Compressed air can be used as the fluid. However, other gases or electrically non-conductive liquids can also be used. The shape memory alloys also ensure that the first actuating element and the second actuating element can be moved in a targeted and reproducible manner. The respective actuating element moves as soon as the force induced by the contraction of the wires overcompensates the force induced by the return element. The valve according to the invention therefore has two valve stages that share the guide and the return element. As a result, the number of parts can be reduced significantly. During operation, both valve stages can be actuated simultaneously or separately. Both valve stages can be operated with a common end position contact. The valve according to the invention makes it possible to produce a mixture of two fluids supplied to the valve. To this end, a first fluid can be supplied via the first opening and a second fluid, which differs from the first fluid, can be supplied via the third opening. To do so, the two valve stages, i.e. the first opening and the third opening, can be opened or closed at least partially simultaneously or in short succession.

The first actuating element and the second actuating element can be displaced translationally relative to one another along the guide with opposite directions of movement. This guided linear movement ensures that the actuating elements move in an easy-to-implement and defined manner. A movement of the two actuating elements against one another can take place via a sliding surface.

The first actuating element and the second actuating element can be arranged in the housing such that both actuating elements are in direct contact with one another, as a result of which a compact design can be made possible.

Each of the two actuating elements can have a cylindrical end portion. Thus, the actuating elements can be arranged in the housing such that the respective end portion faces the other end portion. Here, a diameter of the respective end portion can be selected such that one of the actuating elements can be displaced into the other. The end portions of the two actuating elements also can have an identical diameter, but one of the two end portions can be tapered in diameter such that it can be accommodated in a cavity formed inside the other actuating element.

The first actuating element and the second actuating element of some embodiments are at least partially in the form of a hollow cylinder. In one embodiment, the return element is arranged in an interior of the first actuating element and an interior of the second actuating element. Instead of being in the interior of the actuating elements, the return element can also be arranged on the actuating elements so as to enclose them on the outside.

The return element can be designed as a return spring, preferably as a compression spring, to be able to permanently exert a defined pressure and a corresponding force on the two actuating elements.

The valve according to the invention can be designed such that, in the energized state, the first opening and/or the third opening are closed or opened by the associated sealing element of the corresponding actuating element. In the de-energized state, the valve can therefore be configured as an "NC valve" (NC—normally closed)) or as an "NO valve" (NO—normally open).

In the case of an embodiment as an NC valve, the actuating element body can be connected directly to the sealing element in both actuating elements.

In contrast, in the case of an embodiment as an NO valve, the sealing element can be connected to the actuating element body via the connecting rod for both actuating elements. In this configuration, the connecting rod extending in the direction of the longitudinal axis at least partially penetrates the corresponding opening, i.e. the connecting rod protrudes at least partially into the opening channel formed by the opening, with the corresponding sealing element closing the associated opening in the activated position of the respective actuating element. In the configuration of the valve according to the invention as an NO valve, the corresponding sealing element does not close the corresponding opening on an inwardly directed sealing seat of the corresponding opening, as in the configuration as an NC valve, but on an outwardly directed valve seat of the corresponding opening. Inwardly directed means in the direction of the center of the valve, i.e. in the direction of the return element. On the other hand, outwardly directed means away from the center of the valve in a direction outside of the valve.

The first wire and the second wire preferably are arranged such that they cross without contact. The first wire can extend from a first crimp connection arranged on the housing upward in the direction of a deflection portion of the first actuating element and from the deflection portion of the first actuating element back down to a second crimp connection arranged on the housing. Similarly, the second wire can extend from a third crimp connection arranged on the housing upward in the direction of a deflection portion of the second actuating element and from the deflection portion of the second actuating element back down to a fourth crimp connection arranged on the housing. In this case, the first and the second crimp connections are arranged on the housing at the housing side that has the third opening. In contrast, the third and the fourth crimp connections are arranged on the housing at the housing side having the first opening. To ensure contact-free crossing of the two wires on the longitudinal sides of the two actuating elements, a distance in the transverse direction of the housing between the first and the second crimp connection can be greater than a distance in the transverse direction of the housing between the third and the fourth crimp connection. Typically, the wires are already taut in the rest position. Preferably, the two wires are attached to the housing by the crimp connections such that electrical contacting of the wires is possible independently of one another by means of an electrical control unit.

At least two first wires and at least two second wires can be arranged on the housing at both sides of the first actuating element and the second actuating element to exert uniform pull upon actuation.

The first wire and/or the second wire can also be arranged on the return element or around a circumference of the return element in an at least partially deflected manner. This deflection results in a force-displacement translation and a compact arrangement can be implemented.

The housing of some embodiments is designed to be closed in a fluid-tight manner, except for the three openings. The first opening can form a port for a first fluid, in particular compressed air, the second opening can form a port to a component, in particular to an air cushion element of a vehicle seat, and the third opening can form a port to the ambient air. The housing can be designed in one piece or monolithically. However, provision may also be made for the housing to include a removable and attachable housing insert. In this case, the housing insert is arranged in the housing or inside the housing, with the guide being part of the housing insert in this case. The housing insert itself can be arranged within the housing such that there is a cavity between the three openings. The cavity serves as a channel for the fluid to be influenced by the valve. Alternatively, at least one flow channel can also be located exclusively within the housing, i.e. arranged only in the housing itself, and can extend between the three openings. The housing can thus be designed in one piece or in two pieces with the housing insert.

The first actuating element and the second actuating element each close exactly one of the three openings, namely the first actuating element closes the first opening and the second actuating element closes the third opening. Due to the fluid-tight housing and the easily openable and closable openings or ports, fluid can be let in, let out and held in a component connected to the valve in a controlled manner. When the electric current is applied, the respective actuating element is moved into the activated position. Depending on the configuration of the valve according to the invention as an NC valve or NO valve, the corresponding opening is thus either opened or closed by the associated actuating element in the activated position. The valve according to the invention may be designed as an NC valve since, according to this embodiment, the connecting rod can be dispensed with, as a result of which a particularly simple construction of the valve can be implemented.

The first opening and the third opening are arranged opposite to each other on the housing. The second opening typically is arranged such that the surface normal of this opening is perpendicular to the surface normal of the other two openings. The first opening and the third opening are thus arranged in the valve longitudinal direction, whereas the second opening is arranged in the valve transverse direction. As a result, a clearly defined geometric arrangement in which the fluid can flow is realized.

The second opening can also be arranged in the valve longitudinal direction or in the longitudinal axis direction of the actuating elements. The valve can also have four additional openings. Here, two of the four further openings can be arranged in the valve transverse direction such that they each form a valve transverse channel. The two valve transverse channels can each extend in the valve transverse direction along an outer housing wall, one of the two valve transverse channels being connected to the second opening and each of the two valve transverse channels being connected either to the first opening or to the third opening. The two valve transverse channels can be arranged opposite one another in the valve transverse direction and can extend substantially parallel to one another. Such a configuration offers the advantage that a valve stack assembly, a so-called valve stack, can be formed by a plurality of valves according to the invention. To this end, the valves are connected to one another such that the respective valve transverse channels are aligned and the valves of the valve stack form two common valve transverse channels. The valves can have connecting elements, for example connecting rings, on outside valve corners. The connecting elements are configured to connect an adjacent valve, for example by means of connecting bolts.

The shape memory alloy from which the first wire is formed can be identical to the shape memory alloy from which the second wire is formed. However, different shape memory alloys can also be used.

A component can have one or more valves according to the invention and/or one or more valve stacks to use them to control a volume flow of one or more fluids. The component can be a vehicle seat, for example, in which a volume flow of a gas into and/or out of one or more air cushion elements of the vehicle seat is controlled by one or more valves and/or a valve stack. The valve according to the invention can be used not only in vehicle seats, but also in any other seat systems, such as aircraft seats. In general, the valve can be used in the automotive sector. However, the valve according to the invention can also be used in single-acting cylinders in production plants or for the control or actuation of an armband of a blood pressure measuring device.

DETAILED DESCRIPTION

Figure 1:
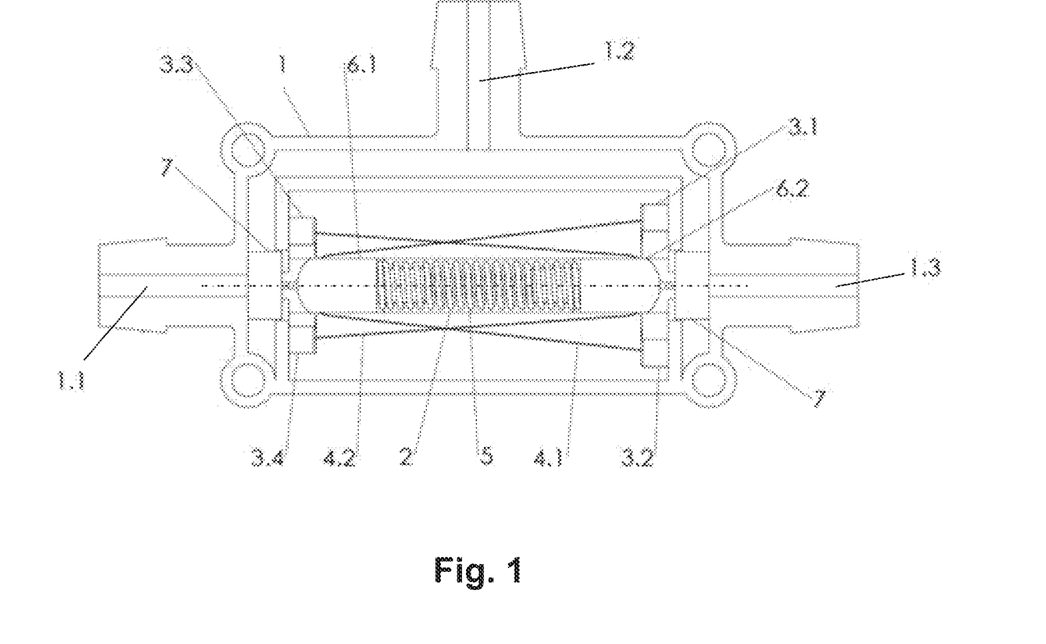
FIG. 1 is a sectional view of a valve according to a first embodiment.

FIG. 1 is a schematic sectional view of a valve with a housing 1 made of plastic and having a first opening 1.1, a second opening 1.2 and a third opening 1.3. The first opening 1.1 and the third opening 1.3 are arranged opposite one another on different ends of the housing 1. In contrast, the second opening 1.2 is offset by 90° with respect to the other two openings 1.1, 1.3 on a longitudinal side of the housing 1. As can be seen from FIG. 1, the valve is designed as an NC valve.

A housing insert 2, also made of plastic, is arranged inside the housing 1 such that a cavity remains between the housing 1 and the housing insert 2 within the housing 1. This cavity extends on the sides of the housing 1 provided with one of the openings 1.1, 1.2 and 1.3 and serves as a channel for conducting a fluid such as air or compressed air. In the illustrated embodiment, the housing insert 2 is formed in one piece or in integrally with the housing 1, but in other embodiments it can also be removable from and insertable into the housing 1.

Moreover, the housing insert 2 has a guide in which a first actuating element 6.1 and a second actuating element 6.2 are guided so as to be displaceable along a common longitudinal axis. The two actuating elements 6.1 and 6.2 are pressed apart by a spring as the return element 5. Opposite ends of the spring are in direct contact respectively with the two actuating elements 6.1 and 6.2. In the closed position of the component shown in FIG. 1, the first actuating element 6.1 and the second actuating element 6.2 rest against stops formed by the housing insert 2. At the end of the respective actuating elements 6.1 and 6.2, however, a sealing element 7, in the example shown a rubber attachment, is attached, so that the first actuating element 6.1 closes the first opening 1.1 with the sealing element 7, while the second actuating element 6.2 closes the third opening 1.3 with the sealing element 7. The second opening 1.2, however, is open. The first actuating element 6.1 and the second actuating element 6.2 are designed in cuboid shapes, but the respective cuboid has a recess on a side facing the sealing element 7.

A first wire 4.1 and a second wire 4.2 are secured to the housing insert 2 and are made of the same shape memory alloy. Each of the wires 4.1 and 4.2 has its ends secured to the housing insert in a crimped connection 3. The first wire 4.1 is connected to the housing insert 2 on a side of the housing insert 2 facing the third opening 1.3 with a first crimp connection 3.1 and a second crimp connection 3.2. In contrast, the second wire 4.2 is connected on an opposite side of the housing insert 2 with a third crimp connection 3.3 and a fourth crimp connection 3.4. The crimp connections 3.1 and 3.2 are arranged on both sides of the second actuating element 6.2, the crimp connections 3.3 and 3.4 are arranged on both sides of the first actuating element 6.1. The first wire 4.1 is guided around the second actuating element

6.2, running in a recess of the actuating element 6.2. Analogous to this, the second wire 4.2 is guided around the first actuating element 6.1.

The housing 1 is closed in a fluid-tight manner except for the openings 1.1, 1.2 and 1.3, but an electrical connection to a control unit can be established at the position of the respective crimp connections 3.1, 3.2, 3.3 and/or 3.4 through the housing insert 2 and the housing 1. If the control unit sends an electrical signal to one of the wires 4.1 or 4.2, i.e. if an electric current or an electrical voltage is applied to them, then they contract. Due to the contraction, a force is exerted on the respective actuating element 6.1 or 6.2, so that the respective actuating element 6.1 or 6.2 is pulled in the direction of the center of the housing 1 and the housing insert 2 against the force of the return element 5 and thus releases the respective openings 1.1 or 1.3.

The valve shown in FIG. 1 is therefore a 3/3-way valve with three ports provided by the openings 1.1, 1.2 and 1.3. For example, the valve can be used as a hydraulic valve for non-electrically conductive liquids or as a pneumatic valve for a vehicle seat. In the latter case, the first opening 1.1 serves as a compressed air port, via which compressed air is supplied from a pump. The second opening 1.2 can be referred to as an air cushion element port via which a load, such as an air cushion element to be filled with compressed air, can be filled with air or vented. The third opening 1.3 can be referred to as an ambient air port, via which the pressure in the air cushion element is reduced during the final ventilation. In this case, the housing insert 2 has the required actuator components in the form of the actuating elements 6.1 and 6.2. The housing 1 and housing insert 2 together seal the valve shown in FIG. 1 against the atmosphere, i. e. against the environment.

Figure 2:
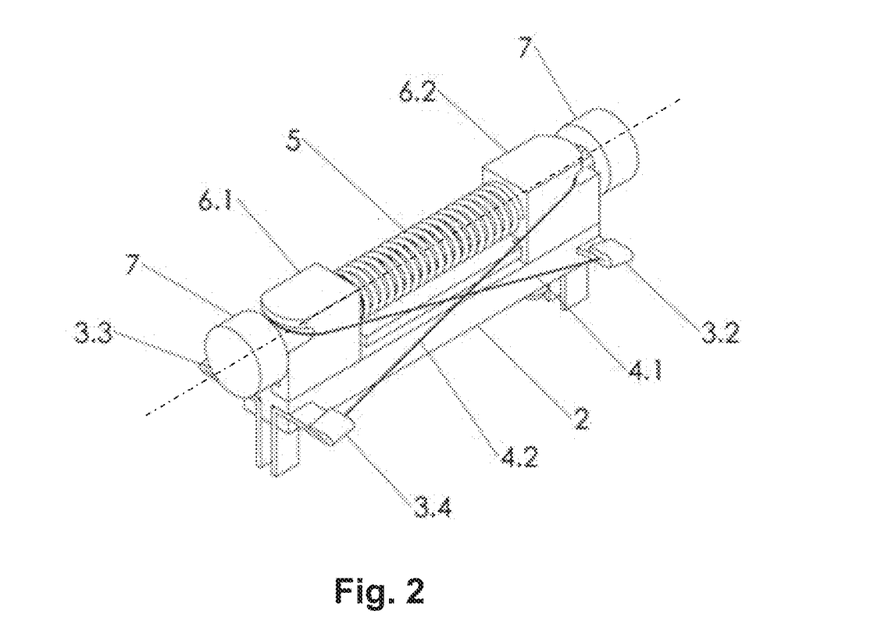
FIG. 2 is a perspective view of part of the valve shown in FIG. 1.

FIG. 2 shows a part of the housing insert 2 in a perspective view. Recurring features are provided with identical reference numerals in this figure as well as in the following figures. The wires 4.1 and 4.2 are designed and taut in a crossing arrangement in the area of the return element 5, with the crossing point being located laterally next to the return element 5. The guide, shown in FIG. 2, for the actuating elements 6.1 and 6.2 can be integral, i. e. designed in one piece, integrally or monolithically with the housing insert 2, but alternatively also be detachably attachable to the housing insert 2.

Figure 3:
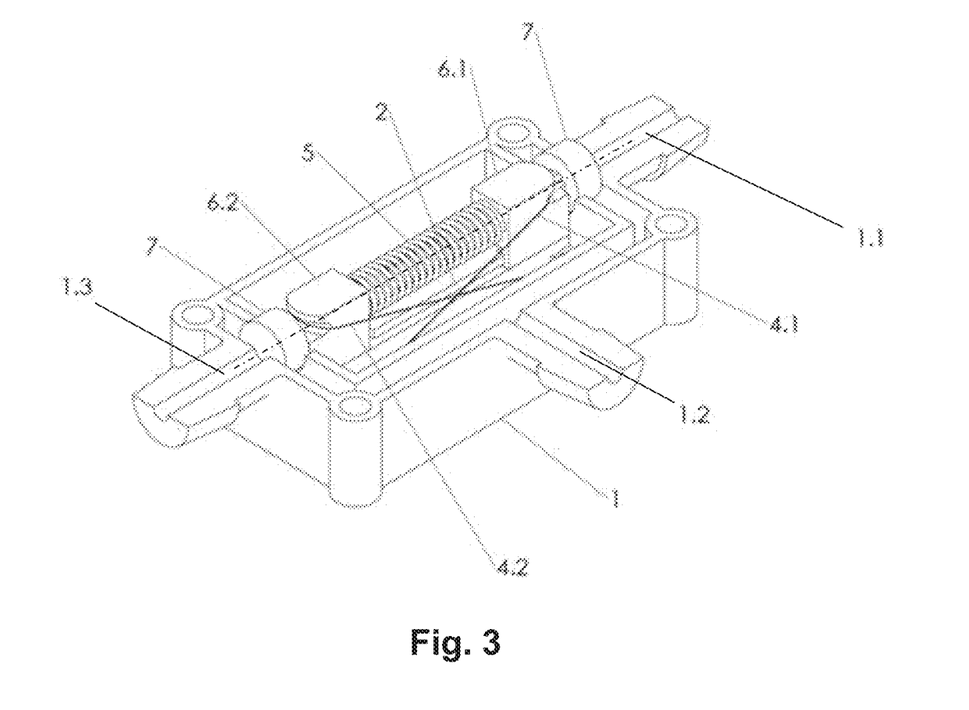
FIG. 3 is a perspective view of the valve shown in FIG. 1.

FIG. 3 shows the valve of FIG. 1 in a perspective view. The first wire 4.1 and the second wire 4.2 are designed in a side view on one side of the actuating elements 6.1 and 6.2 in a crossing arrangement, although none of the wires 4.1, 4.2 touches the other. Activation of one of the wires 4.1, 4.2 by means of an electric current causes the corresponding wire 4.1, 4.2 to contract. The resulting shortening leads to a movement of the corresponding actuating element 6.1, 6.2, as a result of which the first opening 1.1 or the third opening 1.3 is released and is now connected to the valve opening 1.2 via the channel between the housing 1 and the housing insert 2. Here, mechanical energy is stored in the return element 5. When the respective wire 4.1 or 4.2 cools down, the stored mechanical energy ensures that the corresponding actuating element 6.1, 6.2 is returned to its original state.

Figure 4:
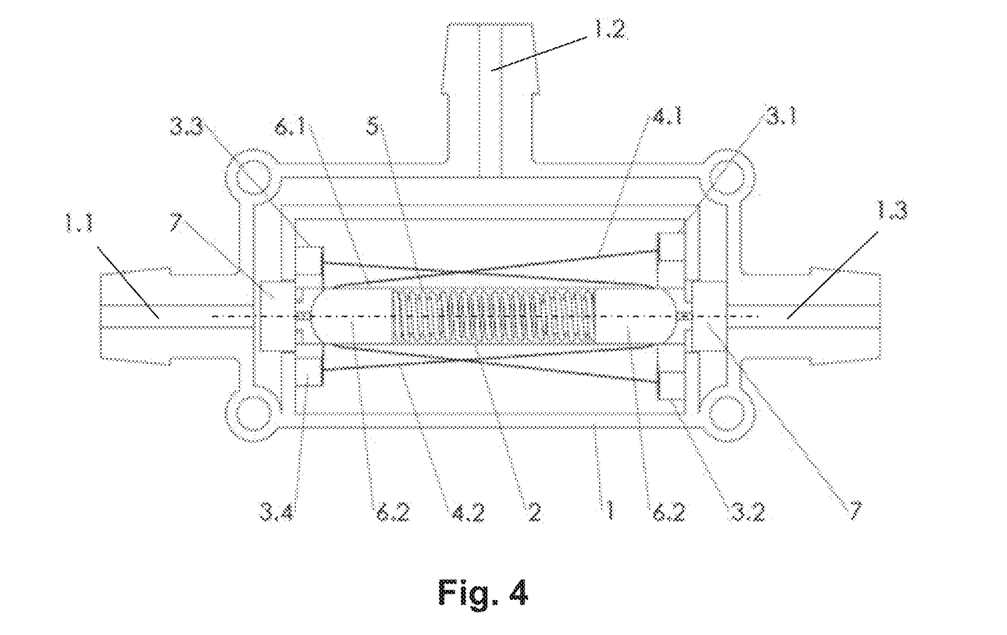
FIG. 4 is an illustration, according to FIG. 1, of the valve that is now open on the left side.

In FIG. 4, the valve is shown in a left-side open position. The first wire 4.1 was thus subjected to an electric current or an electrical voltage, contracted or shortened its length, and thus moved the first actuating element 6.1 away from the first opening 1.1, so that the fluid can flow through the first opening 1.1. Since the third opening 1.3 is still closed, the fluid can only flow in through the first opening 1.1 and out through the second opening 1.2. As shown, the first actuating element 6.1 and the second actuating element 6.2 are arranged within the guide of the housing insert 2 so that they can be moved in a translatory manner relative to one another along the guide with opposite directions of movement. FIG. 4 thus shows the valve described in the "venting" state. Here, the shape memory of the wire 4.1 is activated and the wire 4.1 contracts or shortens its length. The first actuating element 6.1 then moves to the right into the end position, as a result of which mechanical energy is stored in the return spring 5. The sealing element 7 of the first actuating element 6.1 thereby releases the first opening 1.1. The pressurized air can thus flow from the first opening 1.1 through a channel formed between the housing insert 2 and the housing 1 to the second opening 1.2 and fill an air cushion element (not shown). When the first wire 4.1 or the shape memory of the first wire 4.1 is deactivated by removing the electric current or the electrical voltage from the first wire 4.1, it cools down and returns to its predefined length in the rest position of the first actuating element 6.1. This can be done in particular by means of the mechanical energy stored in the return spring 5, which deforms the first wire 4.1 into the length of the first wire 4.1 predefined in the rest position of the first actuating element, the first actuating element 6.1 returns to its rest position and closes the first opening 1.1 again with its sealing element 7. As a result, no further air can flow into the air cushion element (not shown) connected to the second opening 1.2. At the same time, however, no air can escape from the air cushion element, which is not shown—the air cushion element remains filled.

Figure 5:
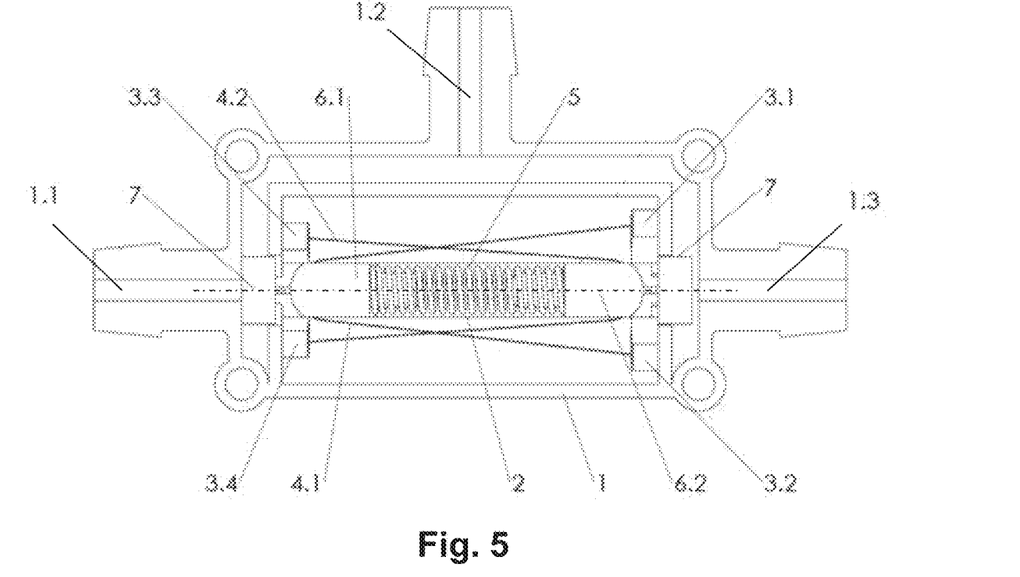
FIG. 5 is an illustration, according to FIG. 1, of the valve that is now open on the right-hand side.

FIG. 5 shows a state in which the second wire 4.2 is subjected to an electric current or an electrical voltage and the third opening 1.3 is thereby opened. Since the first actuating element 6.1, the second actuating element 6.2, the first opening 1.1 and the third opening 1.3 are arranged along a common longitudinal axis, the result is a movement that can be carried out easily and controllably by the wires 4.1 and 4.2, which is effected by few components. The second wire 4.2 must be activated to vent the air cushion element (not shown) connected to the second opening 6.2. This leads to the movement of the second actuating element 6.2 to the left into an end position, whereupon the sealing element 7 of the second actuating element 6.2 lifts off from the third opening 1.3. The excess pressure present in the air cushion element (not shown) is now reduced via the second opening 1.2, with the aid of the channel between the housing insert 2 and the housing 1, toward the third opening 1.3. The air can thus escape from the air cushion element (not shown). When the second wire 4.2 or the shape memory of the second wire 4.2 is deactivated, the second actuating element 6.2 moves back into its rest position.

Figure 6:
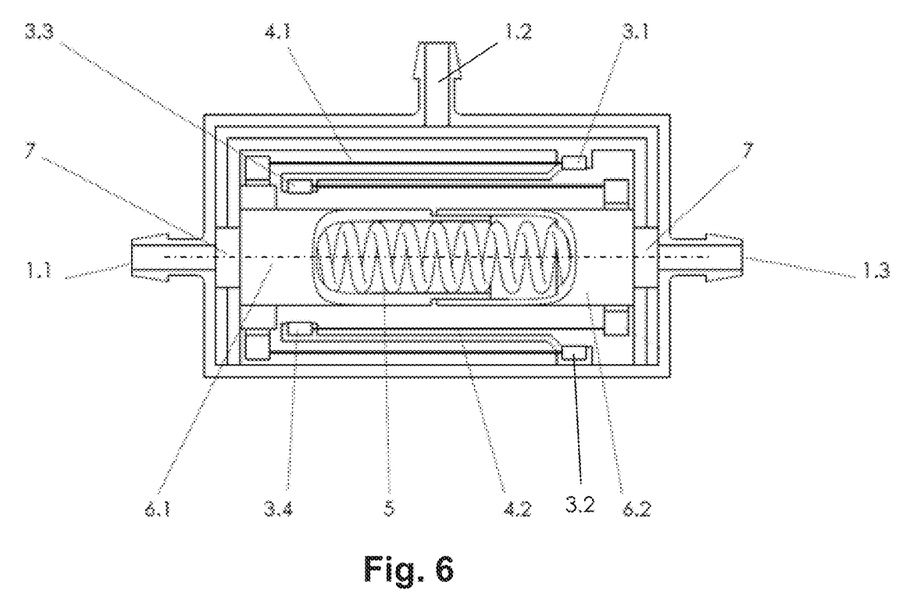
FIG. 6 is a sectional view of the valve according to a second embodiment.

A further embodiment of the valve is shown in FIG. 6, the valve here also being designed as an NC valve. The housing insert 2 in turn has a guide in which the first actuating element 6.1 and the second actuating element 6.2 are guided in a translationally displaceable manner. However, the actuating elements 6.1 and 6.2 are each designed in the form of a hollow cylinder in one end portion and the return element 5 is arranged in their interior in the form of a compression spring designed as a spiral spring, which presses the two actuating elements 6.1 and 6.2 apart and ensures a pretension along the common longitudinal axis. In the closed position of the valve shown in FIG. 6, intersecting circular areas of the end portion of one actuating element 6.1 or 6.2 lie on the end portion of the other actuating element 6.2. and 6.1, respectively. The first actuating element 6.1 and the second actuating element 6.2 are identical in terms of their diameter, except for this area of contact. In said area of contact, the two actuating elements 6.1 and 6.2 are in direct, i.e. immediate touching contact and the diameter of the first actuating element 6.1 is reduced such that the first actuating element 6.1 protrudes in this area into the interior of the second actuating element 6.2 and both touch one another on a sliding surface. The chosen geometry enables a guided relative movement of the two actuating elements 6.1 and 6.2 along the common longitudinal axis and also implements a mechanical end stop.

A taut first wire 4.1 extends on both sides of the first actuating element 6.1, one end of which is secured to the first actuating element 6.1 by means of a crimp connection and the other end of which is secured to the housing insert 2 by means of a crimp connection 3.1 or 3.2. The first actuating element 6.1 is therefore connected to the housing insert 2 with two first wires 4.1, which extend on both sides parallel to the common longitudinal axis of the actuating elements 6.1, 6.2. In contrast, a second taut wire 6.2 extends on both sides of the second actuating element 6.2, one end of which is secured to the second actuating element 6.2 by means of a crimp connection and the other end of which is also secured to the housing insert 2 via a crimp connection 3.3 or 3.4. The second actuating element 6.2 is thus connected to the housing insert 2 with two second wires 4.1, which extend on both sides parallel to the common longitudinal axis of the actuating elements 6.1, 6.2. The wires 4.1 and 4.2 are each made of the same shape memory alloy (e.g. nickel-titanium). The two second wires 4.2 are arranged closer to the common longitudinal axis of the actuating elements 6.1, 6.2 than the two first wires 4.1 in the valve, with the wires 4.1, 4.2 not touching.

One advantage of the concept is the high degree of flexibility, both in the mechanical connection of the wires 4.1 and 4.2 and in their spatial arrangement in the valve. The wires 4.1 and 4.2 can either be suspended and deflected on the corresponding actuating elements 6.1 or 6.2 or crimped with the corresponding actuating element 6.1, 6.2, as shown here. In this case, an electrically conductive double crimp connector mechanically connected to the corresponding actuating element 6.1, 6.2 realizes the electrical connection of the individual wires of the wire pair 4.1 or 4.2. The geometric arrangement of the wires 4.1 and 4.2 can take place differently according to individual installation space specifications. Contrary to the embodiment shown in FIG. 6, in the embodiment shown in FIGS. 1 to 4, an elongated, flat arrangement is realized in which the wires 4.1 and 4.2 are suspended on the respective actuating element 6.1 or 6.2 (so-called U-arrangement), wherein actuator-active parts are aligned along the common longitudinal axis of the actuating elements 6.1, 6.2.

Figure 7:
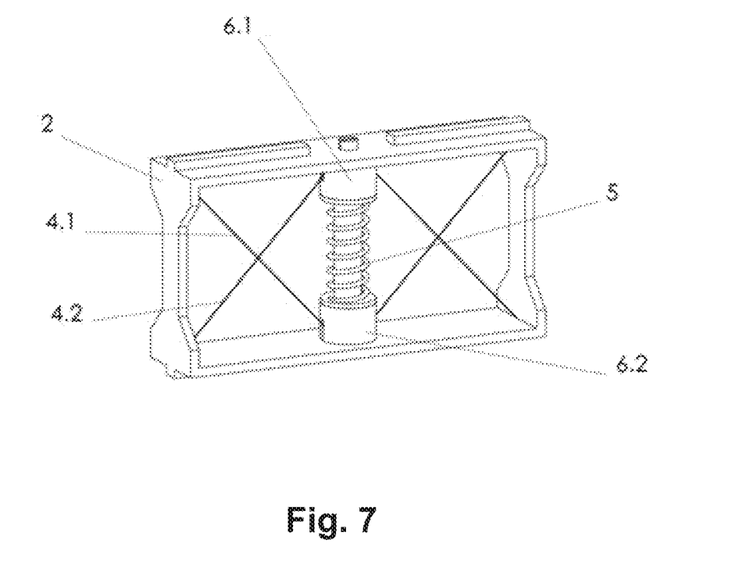
FIG. 7 is a perspective view of a housing insert of the valve according to a third embodiment.

FIG. 7 is a perspective view of a housing insert 2 of a valve according to a third embodiment, the housing insert 2 being designed in a flat design for the first actuating element 6.1 and the second actuating element 6.2. The return element 5 is now arranged on the outside of the two actuating elements 6.1 and 6.2 so as to enclose them. The wires 4.1 and 4.2 are arranged in a V-shape in a plane that runs through the common longitudinal axis of the actuating elements 6.1, 6.2. The two deflected wire ends enclose the respective actuating element 6.1 or 6.2. in each case relative to the common longitudinal axis of the actuating elements 6.1, 6.2 at an angle, whereby a force-displacement translation is realized. This enables the flat design shown. By being secured to the housing insert 2, the two actuating elements 6.1 and 6.2 can act on a sealing seat (not shown) lying outside the housing, which is made e.g. of a membrane. The actuating elements 6.1, 6.2 can thus release or close an opening directly or indirectly.

Figure 8:
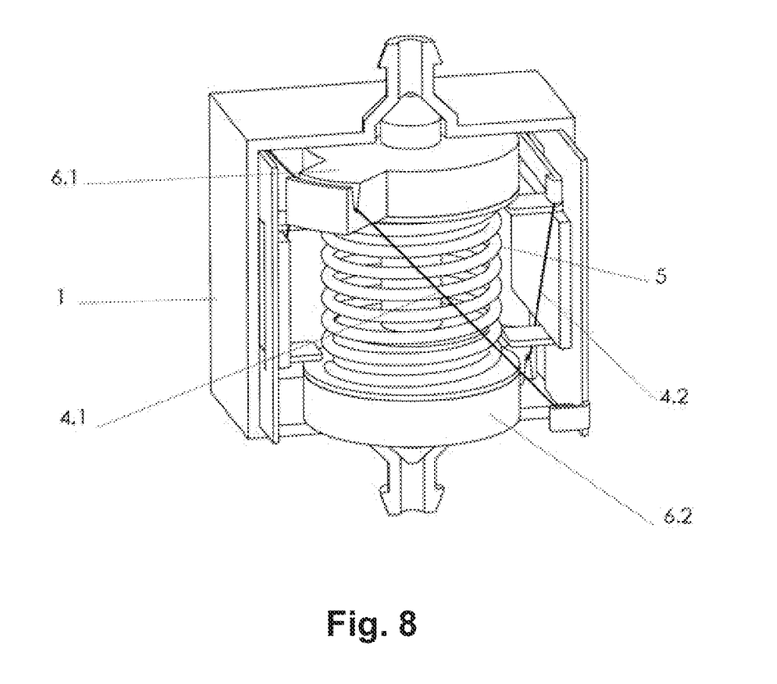
FIG. 8 is a perspective view of a valve according to a fourth embodiment.

FIG. 8 is a perspective view of a fourth embodiment of the valve according to the invention, which is designed as an NC valve in which one end of the wires 4.1 and 4.2 is secured to two opposite corner areas of the valve. As shown in FIG. 8, the first wire, starting from a first lower corner area of the valve, extends upward to a deflection area of the first actuating element 6.1, which is designed as a recess, and from there to a second lower corner area of the valve, which is substantially opposite the first corner area of the valve. The second wire has a similar course to this. Both wire ends enclose an angle with the common longitudinal axis of the actuating elements 6.1, 6.2, as a result of which a force-displacement translation is realized. Compared to the embodiment shown in FIG. 5, there is now a double deflection around the circumference of the return element 5, as a result of which a very compact installation space is realized. As in the embodiments presented above, the first actuating element 6.1 and the second actuating element 6.2 are held in the rest position by the common return element 5. By energizing one of the wires 4.1 or 4.2, the corresponding actuating element 6.1, 6.2 is moved into the activated position.

Figure 9:
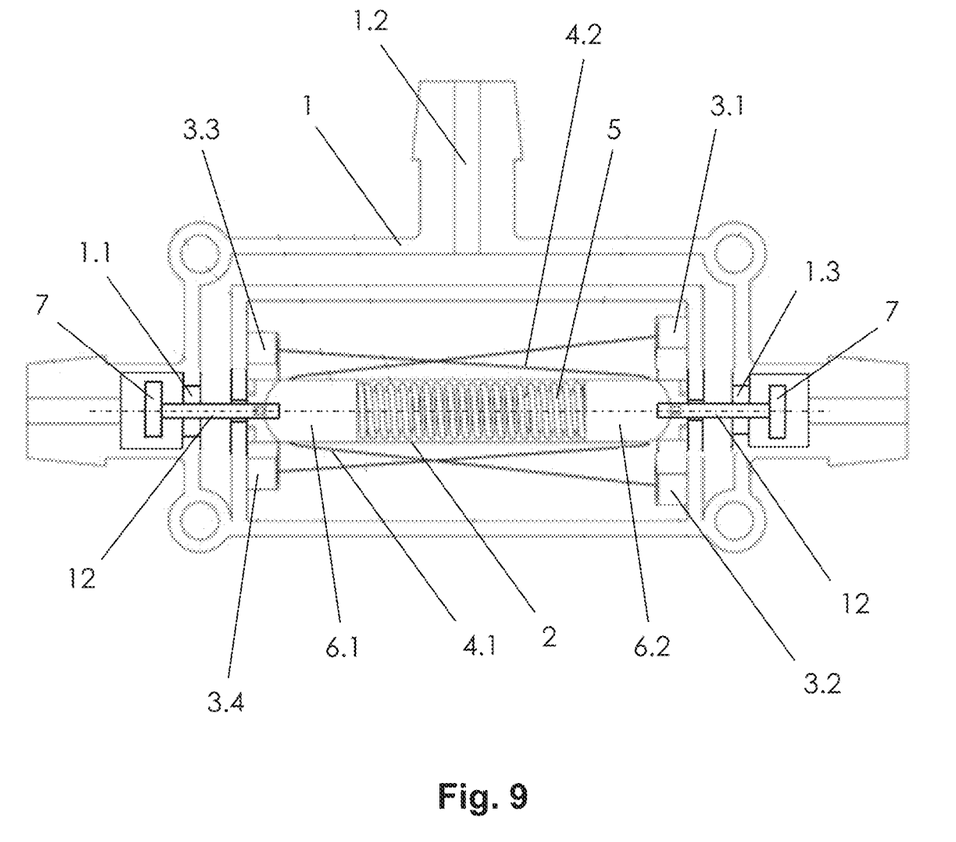
FIG. 9 is a view of a valve according to a fifth embodiment.

FIG. 9 shows a view of a fifth embodiment of the valve according to the invention, the valve being designed as an NO valve and certain components of the valve being shown in section for better understanding. As can be seen from FIG. 9, the two actuating elements 6.1 and 6.2 are each in their rest position, in which the openings 1.1 and 1.3 are released by the sealing elements 7 of the two actuating elements 6.1 and 6.2. The sealing element 7 of the respective actuating element 6.1, 6.2 is connected to a connecting rod 12, which in turn is connected to an actuating element body of the corresponding actuating element 6.1, 6.2. The respective connecting rod 12 extends in part(s) into the corresponding opening 1.1, 1.3 or the corresponding opening channel. In the activated position of the respective actuating element 6.1, 6.2, which is not shown here, the wire 4.1, 4.2 connected to the corresponding actuating element 6.1, 6.2 is shortened. More precisely, when the corresponding wire 4.1, 4.2 is energized, i.e. during the transition from the rest position to the activated position of the respective actuating element 6.1, 6.2, the actuating element body, the connecting rod 12, and the sealing element 7 of the respective actuating element 6.1, 6.2 move along the common longitudinal axis of the two actuating elements 6.1, 6.2 in the direction of a central portion of the valve until the corresponding sealing element 7 closes an outwardly directed sealing seat of the respective opening 1.1, 1.3. Here, mechanical energy is stored in the return element 5 designed as a compression spring. After switching off the current, the corresponding wire 4.1, 4.2 cools down again. The mechanical energy stored in the return element 5 causes the corresponding actuating element 6.1, 6.2 to move back into its rest position. The corresponding sealing element 7 lifts off from the outwardly directed sealing seat of the associated opening 1.1, 1.3, so that the opening 1.1, 1.3 is released by the corresponding sealing element 7, with the corresponding wire 4.1, 4.2 being lengthened compared to its shape memory state.

Figure 10:
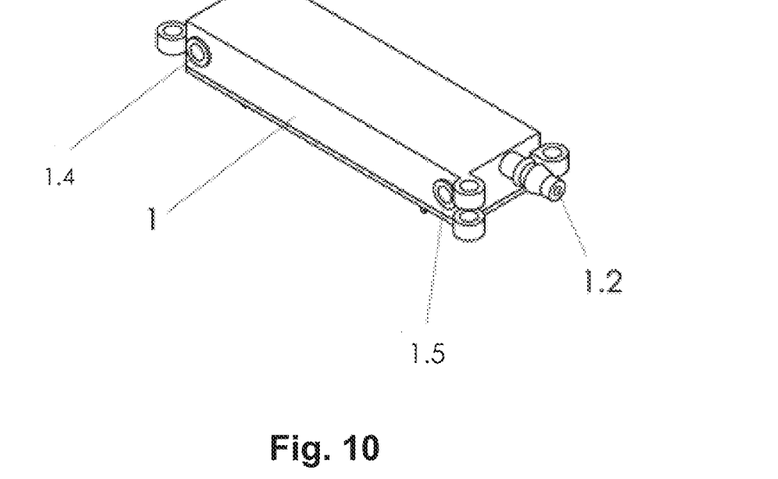
FIG. 10 a perspective view of a valve according to a sixth embodiment.

FIG. 10 is a perspective view of a valve according to the invention, which is configured to be connected to other valves according to the invention to form a stacked assembly or a valve stack. In addition to the openings 1.1, 1.3 located inside the housing 1, the valve also includes the second opening 1.2, a fourth opening 1.4, and a fifth opening 1.5. As can be seen from FIG. 10, the fourth opening 1.4 and the fifth opening 1.5 are each arranged in the housing 1 in the valve transverse direction, i.e. substantially perpendicular to the common longitudinal axis of the actuating elements. The valve 1 can include other openings not shown here. In particular, the valve 1 can, as here, have an opening (not shown) opposite the fourth opening 1.4 on the other side of the valve, which together with the opening 1.4 forms part of a transverse valve channel. The same applies to the fifth opening 1.5. The housing 1 is designed to be fluid-tight except for the openings mentioned and possibly electrical contacts, with the previously described assembly of the actuating elements being accommodated within the housing 1.

Figure 11:
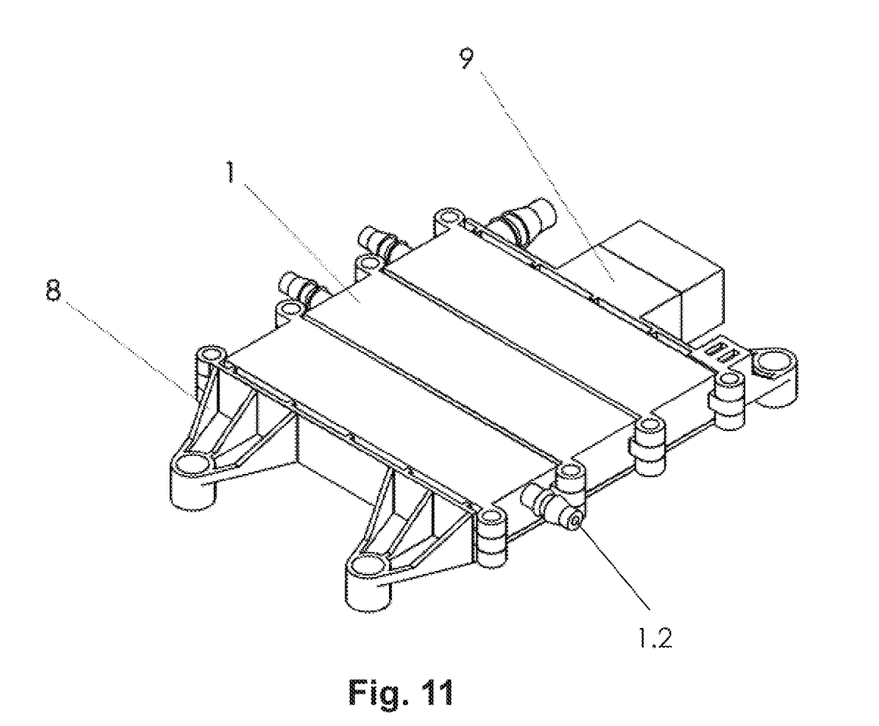
FIG. 11 a perspective view of a stacked assembly of valves.
Figure 12:
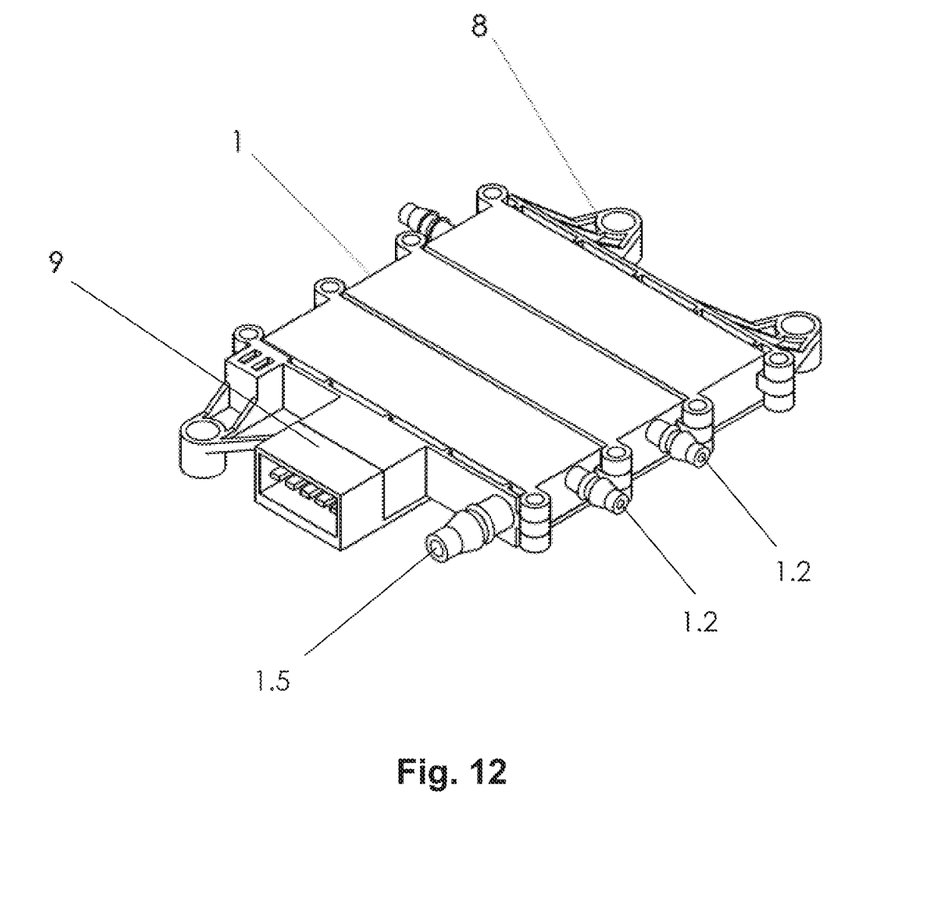
FIG. 12 is a view, according to FIG. 11, of a stacked assembly that is rotated relative to the view shown in FIG. 11.
Figure 13:
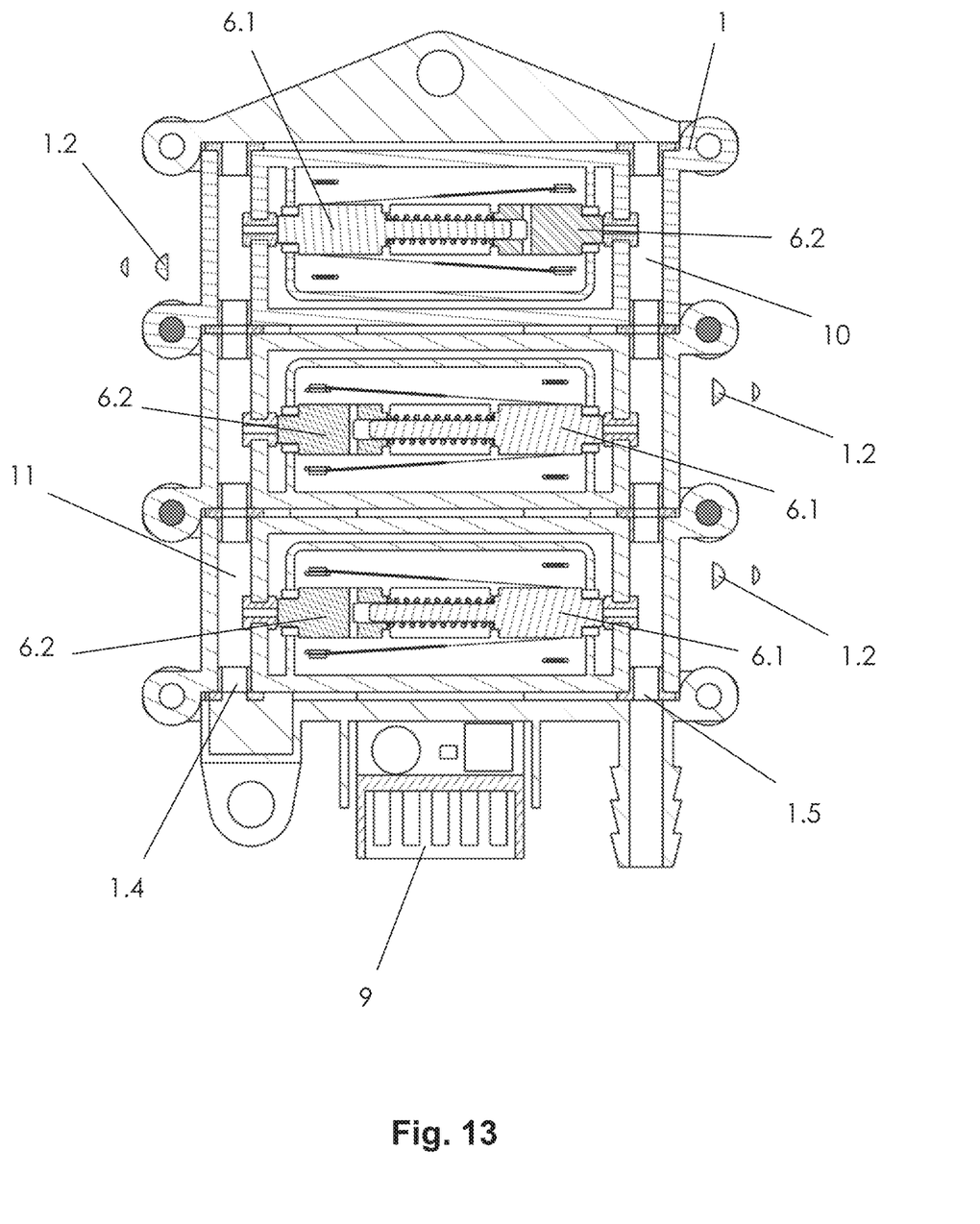
FIG. 13 a sectional view of a stacked assembly of valves.

Several of the housings 1 shown in FIG. 10 together with the components contained therein can, as shown in FIGS. 11 to 13, be lined up to form a stacked assembly, the so-called valve stack. To this end, mutually corresponding openings of the two transverse valve channels located in the housing 1 are provided. In addition, the housings 1 have fastening elements on the outer sides. In the embodiments shown, these are rings that are arranged at the corners and are firmly bonded to the housing 1, with an arrangement of exactly one ring and exactly two rings being attached to the corners alternately in each case. If only one ring is attached to the corner, it is arranged centrally in height and can be introduced into a recess between the two rings of a further housing 1 of an adjacent valve. When two housings 1 are joined together, there is thus a through hole of several rings lying one above the other, into which a fastening element such as a rod or, particularly if the rings have an internal thread, a screw can also be introduced. In this arrangement, the individual transverse valve channels and flow channels inside the valve housing 1 form common rails for the pressure and atmosphere sides. Here, a fastening device 8 with two ring supports can be arranged on one of the housings 1 shown in FIG. 9, and an electrical contact 9 can be provided on another of the housings 1, which is arranged opposite the fastening device 8 in the stack, which is designed e.g. as a plug or socket and allows the control unit, for example a computer, to be connected.

Individual housings 1 or valves can also be rotated through 180°, so that the respective second opening 1.2 can be arranged as desired on the left-hand side or the right-hand side, as shown in FIGS. 11 to 13.

As can be seen from FIG. 13, the respective valve transverse channels of the individual valves in the valve transverse direction form a first common valve transverse channel 10, which can be connected to the ambient air via the opening 1.4 of a valve, and a second common valve transverse channel 11, which can be connected via the opening 1.5 of the same valve by means of a compressed air pump (not shown). An air cushion element (not shown) of a vehicle seat can be connected to the respective second openings 1.2 of the individual valves, so that compressed air can be directed into and/or out of the air cushion elements (not shown) by means of the valve stack shown. By means of the valve stack shown, it is possible not only to guide compressed air generated by a compressed air pump (not shown) directly into the corresponding air cushion elements or to discharge it directly again via the common first transverse valve channel 10, but also to guide compressed air from one air cushion element to another air cushion element.

Of course, the valve stacks shown in FIGS. 11 to 13 can also be connected to other components, for example to components of a production plant or to components of medical devices.

The features of the various embodiments disclosed in the individual embodiments can be combined with one another.

LIST OF REFERENCE NUMERALS 1 housing
1.1 first opening (compressed air port)
1.2 second opening (air cushion element port)
1.3 third opening (atmosphere port)
1.4 fourth opening
1.5 fifth opening
2 housing insert
3.1 crimp connection
3.2 crimp connection
3.3 crimp connection
3.4 crimp connection
4.1 first wire
4.2 second wire
5 return element
6.1 first actuating element
6.2 second actuating element
7 sealing element
8 fastening device
9 electrical contact
10 first common valve transverse channel (atmosphere)
11 second common valve transverse channel (compressed air)
12 connecting rod What it claims is:

1. A valve for controlling one or more fluids, comprising:
a housing (1) having at least a first opening (1.1), a second opening (1.2), and a third opening (1.3);
a first actuating element (6.1) and a second actuating element (6.2) that are each movable along a common longitudinal axis along a guide of the housing (1);
a return element (5) arranged between the first actuating element (6.1) and the second actuating element (6.2), the return element (5) exerting a force and keeps the first actuating element (6.1) and the second actuating element (6.2) in a rest position in which the first actuating element (6.1) closes or opens the first opening (1.1) and the second actuating element (6.2) closes or opens the third opening (1.3);
a first wire (4.1) formed with or from a shape memory alloy and being arranged on the first actuating element (6.1) and on a part of the housing (1) opposite the first actuating element (6.1); and
a second wire (4.2) formed with or from a shape memory alloy and being arranged on the second actuating element (6.2) and on a part of the housing (1) opposite the second actuating element (6.2);
wherein an electric current applied to the respective first or second wire (4.1, 4.2) results in a contraction of the respective wire (4.1, 4.2), so that the corresponding actuating element (6.1, 6.2) is movable from the rest position into an activated position against the force exerted by the return element (5).

2. The valve of claim 1, wherein the first actuating element (6.1) and the second actuating element (6.2) are arranged in directly touching contact with one another on the housing (1), said actuating elements (6.1, 6.2) moving relative to one another via a sliding surface.

3. The valve of claim 1, wherein the first actuating element (6.1) and the second actuating element (6.2) each have hollow cylindrical interiors, and the return element (5) is arranged in the interior of the first actuating element (6.1) and in the interior of the second actuating element (6.2).

4. The valve of claim 1, wherein the return element (5) is a return spring.

5. The valve of claim 1, wherein each of the two actuating elements (6.1, 6.2) comprises a respective sealing element (7) and a connecting rod (12) extending in a longitudinal axis direction, the connecting rod (12) at least partially penetrating the corresponding opening (1.1, 1.3) and, in the activated position of the respective actuating element (6.1, 6.2), the corresponding sealing element (7) closes the corresponding opening (1.1, 1.3).

6. The valve of claim 1, wherein the first wire (4.1) and the second wire (4.2) are arranged such that they cross each other without touching.

7. The valve of claim 1, wherein the first wire (4.1) and/or the second wire (4.2) are arranged in an at least partially deflected manner around a circumference of the return element (5).

8. The valve of claim 1, wherein two first wires (4.1) and two second wires (4.2) are arranged on both sides of the first actuating element (6.1) and the second actuating element (6.2) on the housing (1).

9. The valve of claim 1, wherein the housing (1) has a cavity extending between the first opening (1.1), the second opening (1.2), and the third opening (1.3), or at least one flow channel is located exclusively within the housing (1).

10. The valve of claim 1, wherein the valve has four further openings, and wherein two of the four further openings are arranged in a valve transverse direction such that they each form a valve transverse channel.

11. A valve stack, comprising a plurality of the valves of claim 1.

12. The valve stack of claim 11, wherein the valves are interconnected such that the valves form a common first valve transverse channel (10) and a common second valve transverse channel (11) in the valve transverse direction.

13. A component comprising the valve stack of claim 11, wherein a volume flow of one or more fluids can be controlled by the valve stack.

\* \* \* \* \*